(12) United States Patent
DeMorais et al.

(10) Patent No.: US 9,593,728 B2
(45) Date of Patent: Mar. 14, 2017

(54) DISK BRAKE CALIPER PISTON SYSTEM

(71) Applicant: MANDO CORPORATION, Pyeongtaek-si (KR)

(72) Inventors: Antonio Eduardo DeMorais, South Lyon, MI (US); Daniel Smith, Livonia, MI (US); Sangyong Lim, Novi, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/805,469

(22) Filed: Jul. 22, 2015

(65) Prior Publication Data

US 2017/0023079 A1    Jan. 26, 2017

(51) Int. Cl.

| | |
|---|---|
| *F16D 55/16* | (2006.01) |
| *F16D 65/18* | (2006.01) |
| *F16D 55/22* | (2006.01) |
| *F16D 65/00* | (2006.01) |
| *B60T 1/06* | (2006.01) |
| *F16D 121/04* | (2012.01) |
| *F16D 121/14* | (2012.01) |
| *F16D 123/00* | (2012.01) |

(52) U.S. Cl.
CPC ............. *F16D 65/18* (2013.01); *B60T 1/065* (2013.01); *F16D 55/22* (2013.01); *F16D 65/005* (2013.01); *F16D 2121/04* (2013.01); *F16D 2121/14* (2013.01); *F16D 2123/00* (2013.01); *F16D 2200/0004* (2013.01); *F16D 2200/0034* (2013.01)

(58) Field of Classification Search
CPC ........ F16D 65/14; F16D 65/18; F16D 65/567; F16D 65/0979; F16D 65/2121; B29C 70/68
USPC .............. 188/72.4, 72.6–72.9, 106 A, 106 P, 188/196 D, 264 G
See application file for complete search history.

(56) References Cited

U.S. PATENT DOCUMENTS

| | | | | |
|---|---|---|---|---|
| 3,770,082 | A | * 11/1973 | Brooks | ................. F16D 65/567 188/106 F |
| 4,193,179 | A | 3/1980 | Confer et al. | |
| 4,449,447 | A | * 5/1984 | Yanagi | .................... B29C 70/68 188/264 G |
| 5,086,884 | A | * 2/1992 | Gordon | ............... F16D 65/0979 188/196 D |
| 5,105,917 | A | 4/1992 | Sporzynski et al. | |
| 5,350,042 | A | * 9/1994 | Thiel | ..................... F16D 65/567 188/196 D |

(Continued)

*Primary Examiner* — Christopher Schwartz
(74) *Attorney, Agent, or Firm* — Ladas & Parry, LLP

(57) ABSTRACT

A disk brake piston system having a piston having a metallic outer wall surrounding a central axis, the outer wall being of a material and a thickness which that could be formed by deep drawing; a metallic front wall closing one end of the outer wall, the front wall including a curved area extending toward an interior of the piston, the front wall being of a material and having a thickness that could be formed by deep drawing; and a sleeve positioned at least partially within the piston and configured to interface with an interior side surface of the outer wall such that the sleeve and the piston are restrained from rotating relative to one another around an axis parallel to the central axis, the sleeve comprising a flat or curved internal surface, having a non-circular cross-section, wherein the sleeve comprises a polymeric material.

18 Claims, 12 Drawing Sheets

(56) References Cited

U.S. PATENT DOCUMENTS

| | | | |
|---|---|---|---|
| 5,507,369 A | | 4/1996 | Ferreira et al. |
| 5,713,435 A | * | 2/1998 | Schneider ............... F16D 65/14 188/264 G |
| 6,637,317 B1 | | 10/2003 | Zeibig et al. |
| 6,988,596 B2 | * | 1/2006 | Gerard .................... F16D 65/18 188/196 D |
| 8,056,684 B2 | | 11/2011 | Smith et al. |
| 8,869,677 B2 | | 10/2014 | Koch et al. |
| 2005/0109569 A1 | * | 5/2005 | Sporzynski ............. F16D 65/18 188/218 XL |
| 2006/0289251 A1 | | 12/2006 | DeMorais et al. |
| 2006/0289253 A1 | | 12/2006 | DeMorais et al. |
| 2008/0087507 A1 | | 4/2008 | DeMorais et al. |

* cited by examiner

DISK BRAKE CALIPER PISTON SYSTEM

TECHNICAL FIELD

This disclosure relates pistons for disk brake systems.

BACKGROUND

The present disclosure relates to disk brake caliper pistons and piston systems, such as are used for various vehicles including automobiles, trucks, aircraft and the like. Embodiments of the disclosure include pistons having provision for a screw actuated braking capability including those having a treaded actuator system for a parking brake and a pressure actuated capability for additional braking capability such as braking capability actuated by a pneumatic or hydraulic pressure source. In various embodiments, the screw actuated braking capability can be actuated by a motor such as an electric motor or any other suitable type of motor.

Disk brake pistons, such as disclosed herein, can be of any suitable construction, such as being made from forged steel which can be machined to provide external sealing surfaces and an internal cavity. As shown in FIGS. 1 and 2, an embodiment of a forged steel piston 1 has an internal cavity 2 with a threaded spindle 3 engaging an internally threaded nut 4 which upon relative rotation between the spindle 3 and the nut 4 the nut moves linearly toward or away from the brake pad end of the piston 5. Upon relative rotation in a first direction, the nut 4 moves toward the brake pad end of the piston 5 and then engages and pushes against the brake pad end of the piston, with the brake pad end of the piston 5 engaging the brake pad 6 directly or indirectly and causing a braking action between the brake pads 6, 7 and the rotor. In some embodiments, the movement of the nut 4 toward the brake pad end of the piston 5 can be done in conjunction with a pressure force being applied to the piston, and the force applied by the nut 4 to the brake pad end of the piston 5 can supplement the pressure force or can serve to partially or fully maintain the force applied to the piston by the pressure system when the pressure is reduced or eliminated. In some embodiments, the spindle 3 and nut 4 can be part of a parking brake, such as an electromechanically actuated parking brake actuated by a motor 8.

Upon relative rotation in a second direction, the nut 4 moves away from the brake pad end of the piston 5 and reduces and/or removes the force of the nut 4 acting upon the brake pad end of the piston 5.

However, while pistons made from forged steel with machined surfaces can be strong and have precise dimensions, they can be heavy and expensive to make. Difficulties in manufacturing can be particularly evident in some aspects of the machining necessary for the internal structure of the piston.

Forged pistons can have a nut contact surface 9 having a conical shape which interfaces with a piston contact surface 10 of the nut 4. Such a conical shape on the interior front portion of the piston 1 can result in a brake pad end of the piston 5 having a thinner center and thicker edges. The brake pad end of the piston 5 can have a flat face which exerts force directly or indirectly upon the brake pad 6, or the brake pad end of the piston 5 can have a stepped face or some other design of face. However with a forged piston, the brake pad end of the piston 5 can be highly rigid due to the materials used and the shape of the brake pad end of the piston 5 structure.

Further, while the use of plastic material, such as those made from phenolic resin, for production of pistons can result in a lighter and less expensive piston, a plastic piston is generally not as strong as steel and can be prone to catastrophic failure such as cracking. Efforts to make a stronger plastic piston can rely upon thicker walls being used for the plastic piston. However, thicker walls can lead to a reduction in the inner diameter of the piston which can lead in turn to a reduction in hydraulic (or pneumatic) advantage or an increase in the diameter of the piston which can lead to a need to increase the size of other brake components. In addition, the construction of a disk brake piston, a disk brake piston assembly and the features internal thereto are desirably designed so as to facilitate assembly and service operations, including but not limited to filling the brakes with an appropriate fluid and purging undesireable fluids from the interior of the piston, such as by bleeding a hydraulic brake system.

SUMMARY

In a first embodiment disclosed herein is a disk brake piston system comprising: a piston comprising: a metallic outer wall surrounding a central axis, the outer wall being of a material and a thickness which that could be formed by deep drawing; a metallic front wall closing one end of the outer wall, the front wall including a curved area extending toward an interior of the piston, the front wall being of a material and having a thickness that could be formed by deep drawing; and a sleeve positioned at least partially within the piston and configured to interface with an interior side surface of the outer wall such that the sleeve and the piston are restrained from rotating relative to one another around an axis parallel to the central axis, the sleeve comprising a flat or curved internal surface, having a non-circular cross-section, wherein the sleeve comprises a polymeric material.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
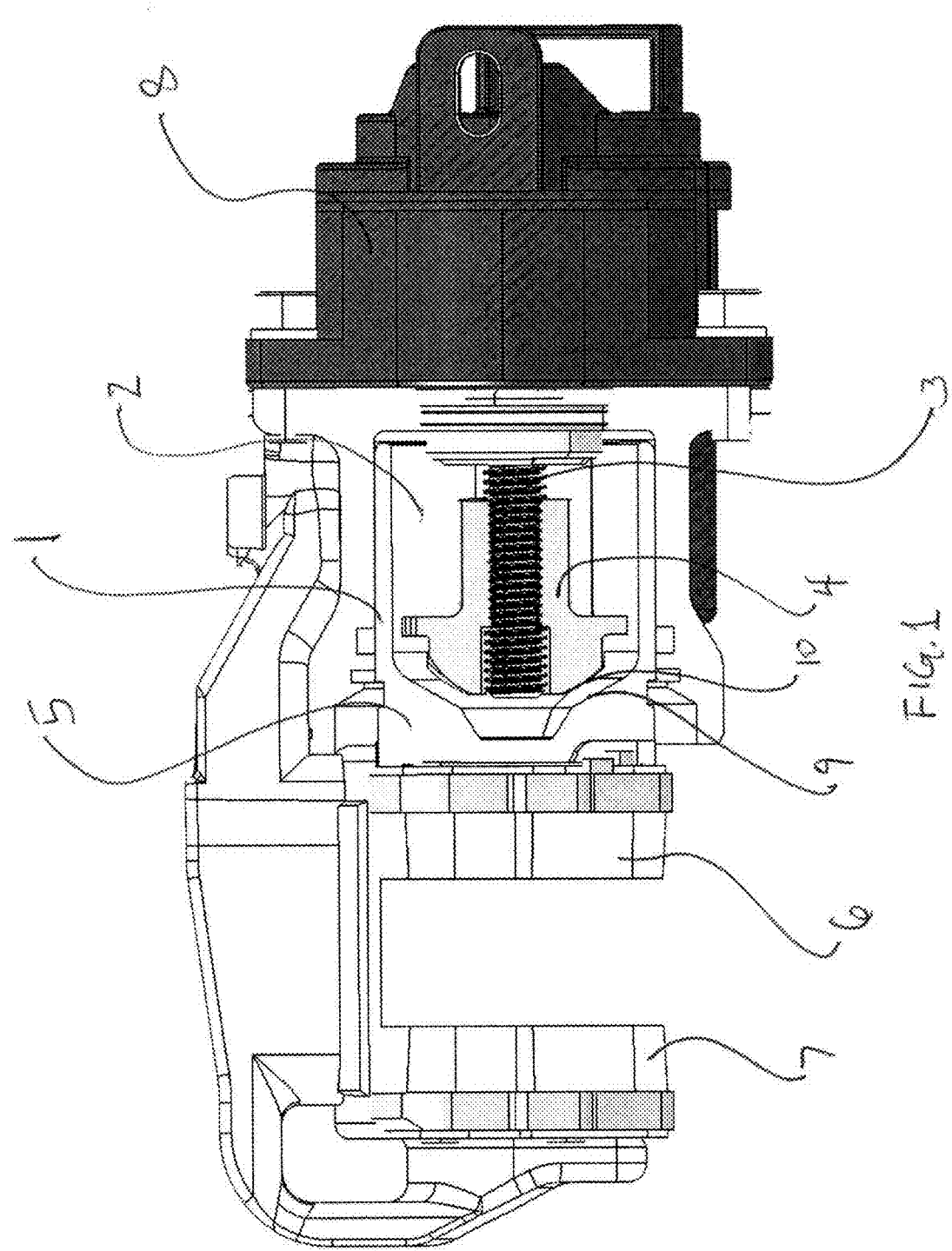
FIG. 1 shows a diagram of an embodiment of a brake system utilizing a forged piston.
Figure 2:
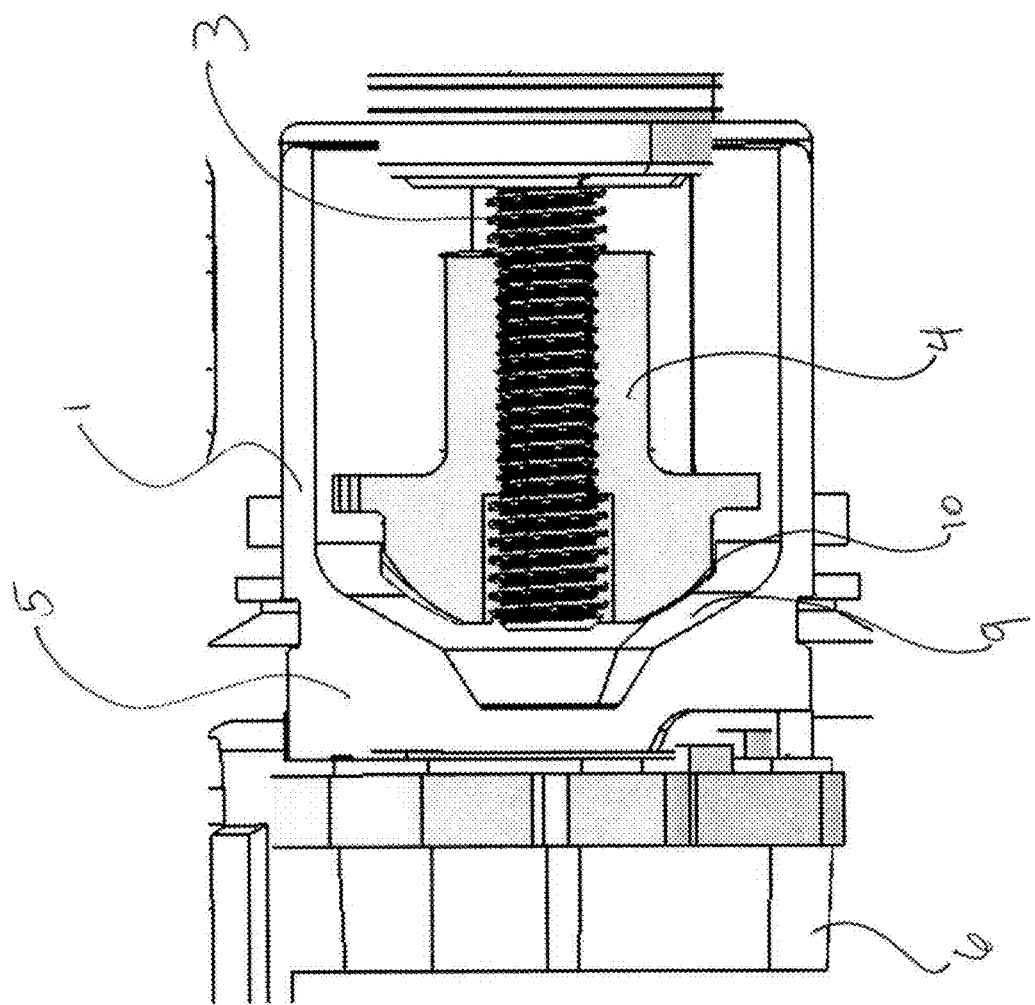
FIG. 2 shows a diagram of an embodiment of a forged piston.
Figure 3:
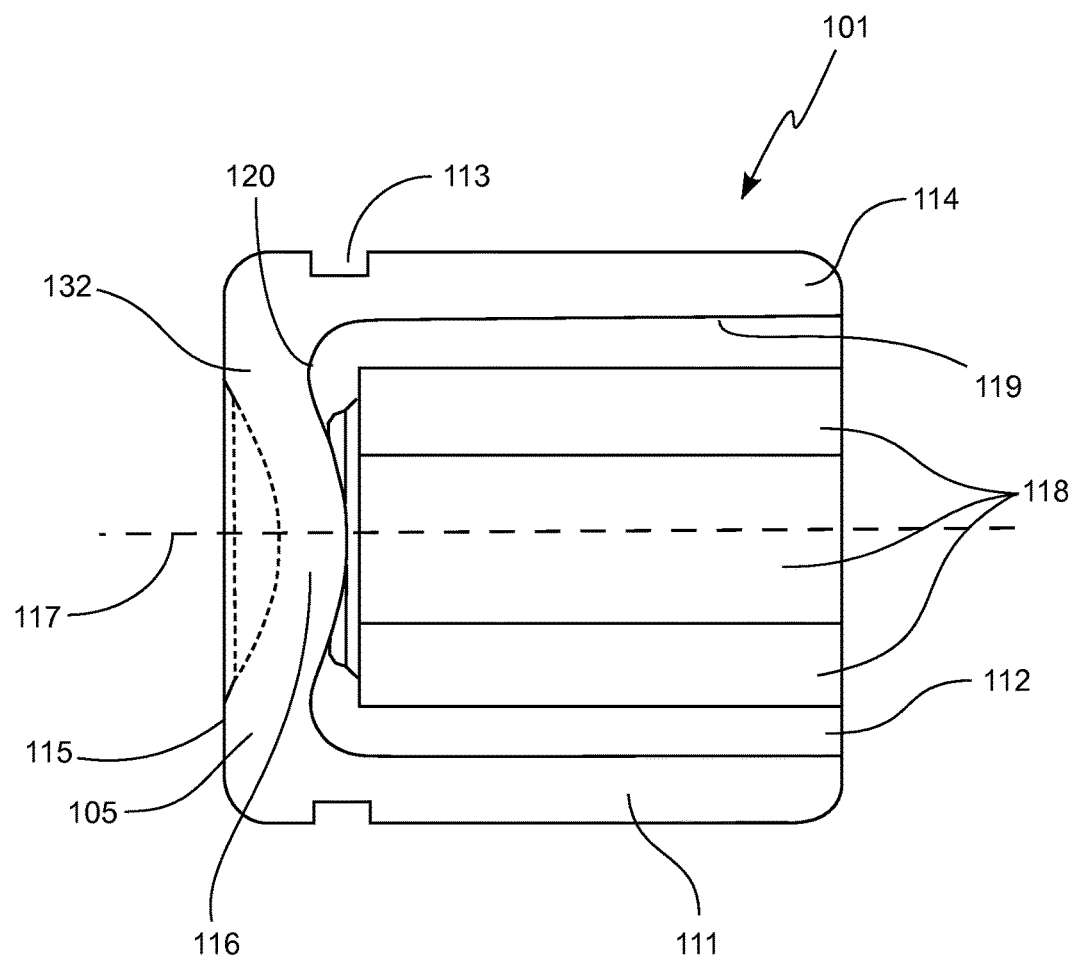
FIG. 3 shows a diagram of an embodiment of a lined piston.

FIG. 3 shows an embodiment of a disk brake piston 101 having a deep drawn piston body 111 and a piston sleeve 112. Also shown is a piston wall seal groove 113 which can receive a seal material, such as an O-ring of an appropriate design for forming a seal with a portion of a brake caliper system, such as a caliper body. In some embodiments, the wall seal groove 113 can be absent, or a seal groove for an O-ring can be present in the matching surface, such as in the caliper body where the disk brake piston 101 is received. The piston body 111 has a piston outer wall 114 running around the sides of the piston 101 and a brake pad end of the piston 105 having a front wall 132 closing one end of the piston 101. The brake pad end of the piston includes a piston face 115 configured to transfer force directly or indirectly to a brake pad 6 in operational communication with the piston face 115. The brake pad end of the piston 115 can include a curved end 116 shaped to curve toward the interior of the brake piston 101. The curved end 116 can form a domed shape and can have a cross section which describes a portion of a circle, ellipse, arch, ovoid, or other curved shape. In some embodiments, the curved end 116 can have a flattened portion, such as a flattened central portion. In some embodiments, the curved end 116 can be a smooth curve or can have one or more points/lines/curves of discontinuity such as a corner. In some embodiments, the curved end 116 can be a surface formed of a series of two or more curved segments, and in some embodiments, the curved end 116 can be formed of a single curved segment. In some embodiments, a cross section in a first plane can be the same as the cross section in another plane, such as a plane positioned at a right angle to the first plane, where the two planes intersect at a line that corresponds to a central axis of the piston 117 along a line of travel of the piston 101.

The piston body 111 can also fully or partially enclose a piston sleeve 2. The piston sleeve 112 can be a polymeric material, such as a thermosetting or thermoplastic polymer. Preferred polymeric material can include polymeric material made from a phenolic resin, or other appropriate polymeric material having suitable strength, rigidity, chemical resistance, low compressibility, and temperature capabilities for use in the environment of a disk brake piston. For example, a polymeric materials having a temperature stability up to approximately 150° C., 200° C., 250° C. 300° C., 350° C. or higher can be favorably incorporated into the design. Suitable polymeric materials can be filled, such as glass fiber-filled, mineral-filled, metal-filled, and/or filled with other material appropriate for the strength temperature and durability requirements, or unfilled. Polymeric materials may be laminated and/or reinforced as desired. Suitable polymeric materials can include, but are not limited to, those made from phenolic resins such as novolacs and resols and include cross-linked forms of phenolic resins.

In some embodiments, polymeric material having chemical resistance toward one or more brake fluids such as brake fluids utilizing a glycol-ether base, polyethylene glycol base, mineral oil base, castor oil base, alcohol base borate ester base or silicone base, or brake fluids based upon some other material as well as combinations of these materials can be favorably used when properly matched to the brake fluid to be used.

Figure 5:
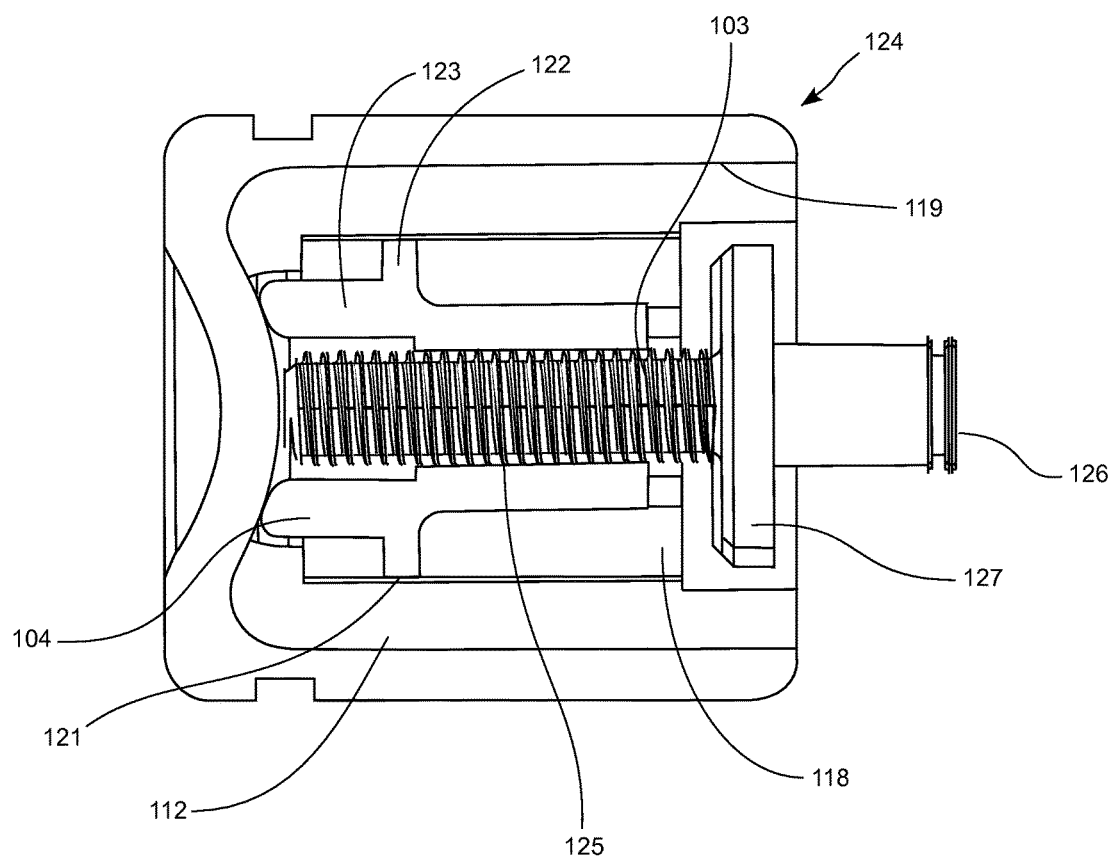
FIG. 5 shows a diagram of an embodiment of a lined piston assembly.

The piston sleeve 112 can have one or more internal surfaces 118 for interfacing with a nut 104, as shown in FIG. 5, which can be positioned within the piston sleeve 112, and the internal surface 118 serves to limit and/or prevent relative rotation between the nut 104 and the piston sleeve 112. The internal surfaces of the sleeve 118 can also be configured to allow the nut to move axially in a direction substantially parallel to a central axis 117 of the piston.

The central axis 117 and the brake pad end of the piston 105 can be configured such that the central axis 117 is perpendicular or substantially perpendicular to the piston face 115. The central axis 117 and the brake pad end of the piston 105 can be configured such that the central axis passes through a high point of the curved end 116 or proximate a high point of the curved end 116.

Figure 4:
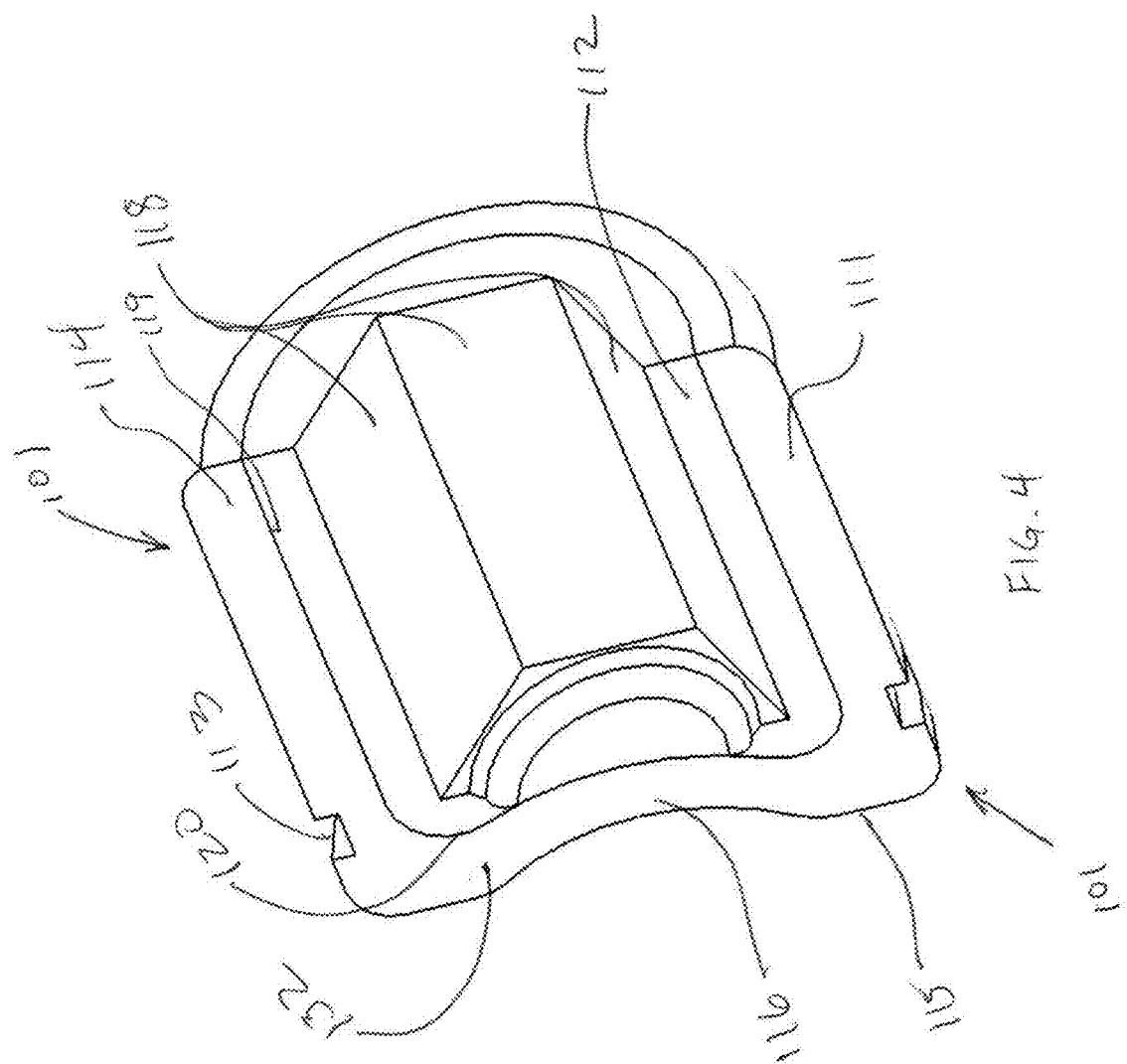
FIG. 4 shows a perspective view of an embodiment of a lined piston.
Figure 12:
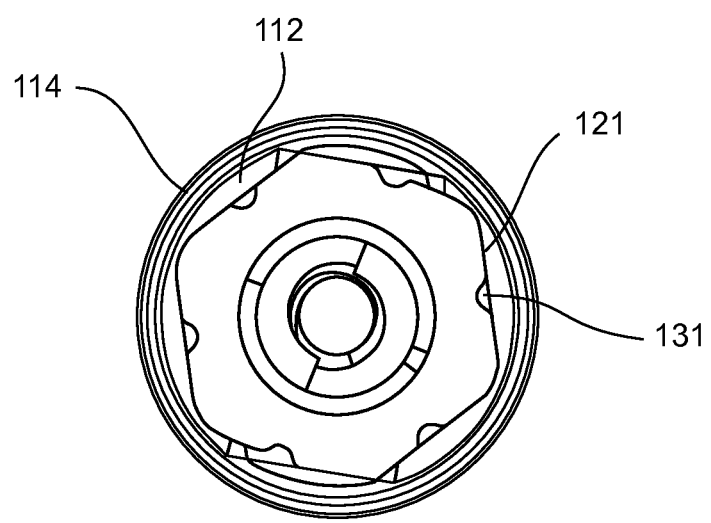
FIG. 12 shows a diagram of a nut in a piston.

The internal surface of the sleeve 118 can be configured to comprise 3 flat surfaces on one side of the sleeve as shown in FIG. 4, or six flat surfaces arranged so as to interface with a hexagonal shaped nut, as shown in FIG. 12. However, in various embodiments, the internal surface of the sleeve 118 can be configured to comprise various numbers of flat surfaces, such as 1, 2, 3, 4, 5, 6, 7, 8 or more and the flat surfaces can be configured to interface with a nut having a suitable number of flat surfaces, such as the same number of flat surfaces, greater than or fewer than the number of flat surfaces on the sleeve 118, and the number of flat surfaces can be 1, 2, 3, 4, 5, 6, 7, 8 or more. In addition, one or more or all of the flat surfaces of the sleeve 118 can be replace with curved ends, such as curved ends having a higher or lower radius of curvature than a radius of curvature of the piston body 111, and the curved ends can be curved outward or inward. In some embodiments, the flat or curved ends of the sleeve which interface with the nut 104 can be linked by sharp corners, or by radiused corners or by circular cut-out corners.

In some embodiments, the surfaces of the nut 121 corresponding to the flat or curved ends of the sleeve 118 can be flat or curved or some combination thereof and configured to interface with the flat or curved ends of the sleeve 118 to limit, restrict or prevent relative rotation between the sleeve 112 and the nut 104.

In some embodiments, the brake pad end of the piston 105 can be resilient, reversibly deforming under load from the nut 104. In some embodiments, the curvature of the curved end 116 provides resilience by deformation of the shape of the curve. In some embodiments, a force can be applied by the nut 104 to the brake pad end of the piston 105 which reversibly deforms the brake pad end of the piston 105 while one or more of the associated brake rotor, caliper, pad, piston and other components of the brake or associated wheel are at an elevated temperature as compared to the ambient temperature, and the brake pad end of the piston 105 and curvature of the curved end 116 are configured such that as the temperature of the components at elevated temperature decreases, a portion of the force applied by the nut to the brake pad end of the piston can in some embodiments decrease due for example to thermal shrinkage of one or more components, but the force remains at a suitable level of force for use as a parking brake. In some embodiments, a force suitable for use as a parking brake remains even after the temperature of the brake and wheel components decreases to ambient temperature.

FIG. 5 shows an embodiment of a disk brake piston assembly, where the sleeve 112 covers the entire interior side wall surface 119 of the piston body 111 and also covers a portion of the front wall 132 of the brake pad end of the piston 105. The nut 104 shown also includes a threaded interior surface which operationally engages the threaded spindle 103 and a piston contact surface 110 which is configured to push against the nut contact surface 109 of the brake pad end of the piston 105. The nut can be internally treaded for only a portion of its length, as shown in FIG. 5, or for its entire length. The nut can include a flanged section 122, which can include one or more surfaces 121 which engage the sleeve 112 to limit, restrain, impair or prevent relative rotation of the sleeve 112 and the nut 104. In some embodiments, the section 123 of the nut 104 which engages the brake pad end of the piston 105 can be wider than a section located at the opposite end of the nut.

Figure 6:
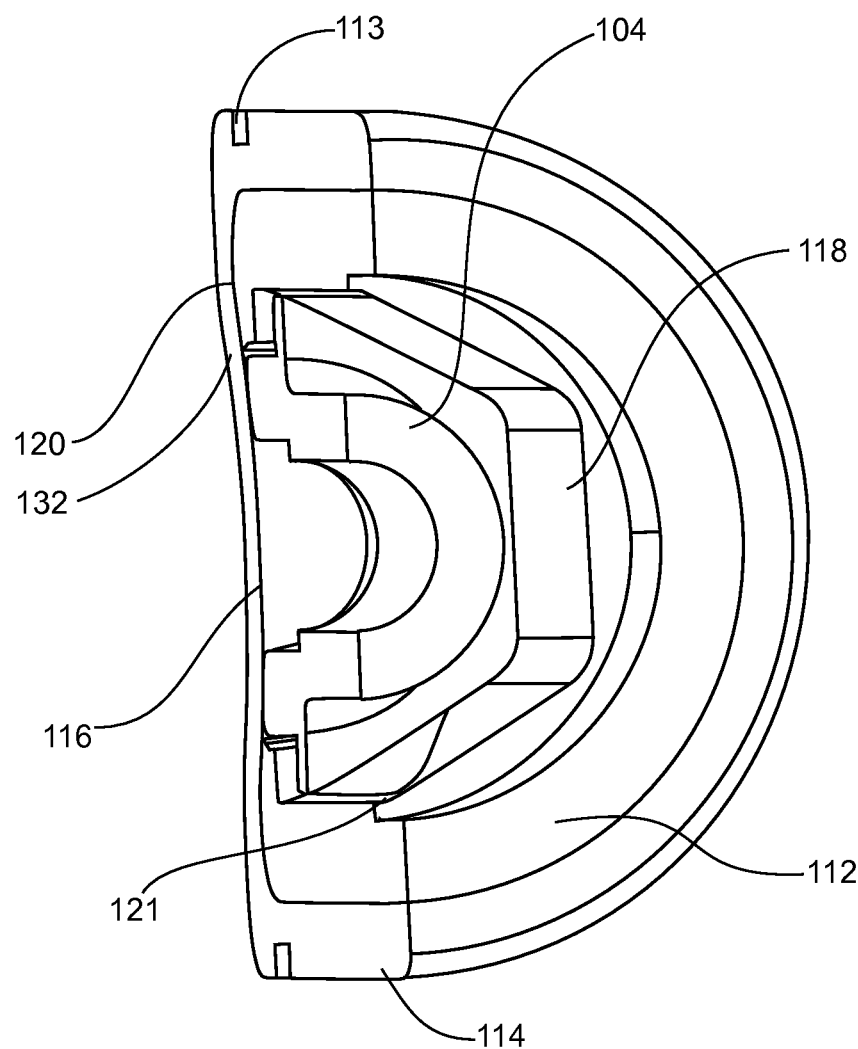
FIG. 6 shows a perspective view of an embodiment of a lined piston assembly.

FIG. 6 shows an embodiment of a portion of a lined piston 101 showing the engagement of a flanged portion 122 of a nut 104 with surfaces 118 of the sleeve 112.

Figure 7:
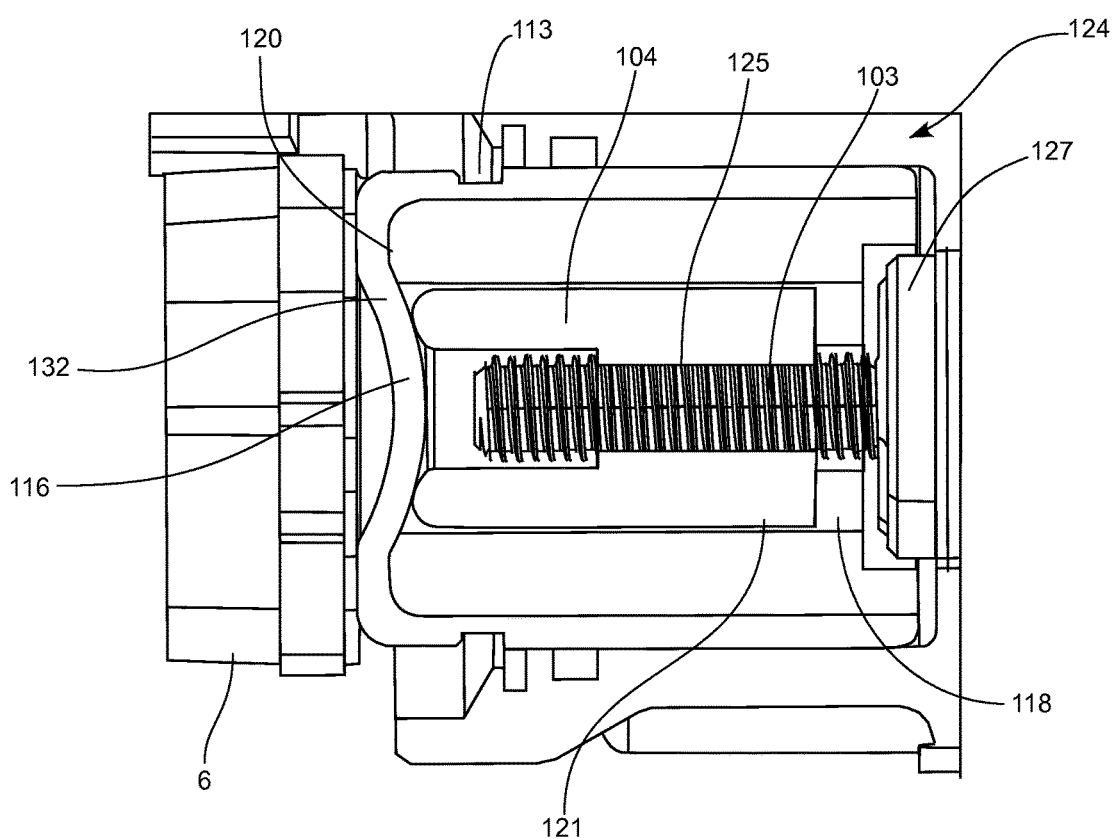
FIG. 7 shows a diagram of an embodiment of a lined piston assembly.

FIG. 7 shows an embodiment of a lined piston assembly 124 where the nut 104 has a substantially constant cross sectional dimension and the entire length of the nut 104 interfaces with the interior surface of the sleeve 118.

Figure 8:
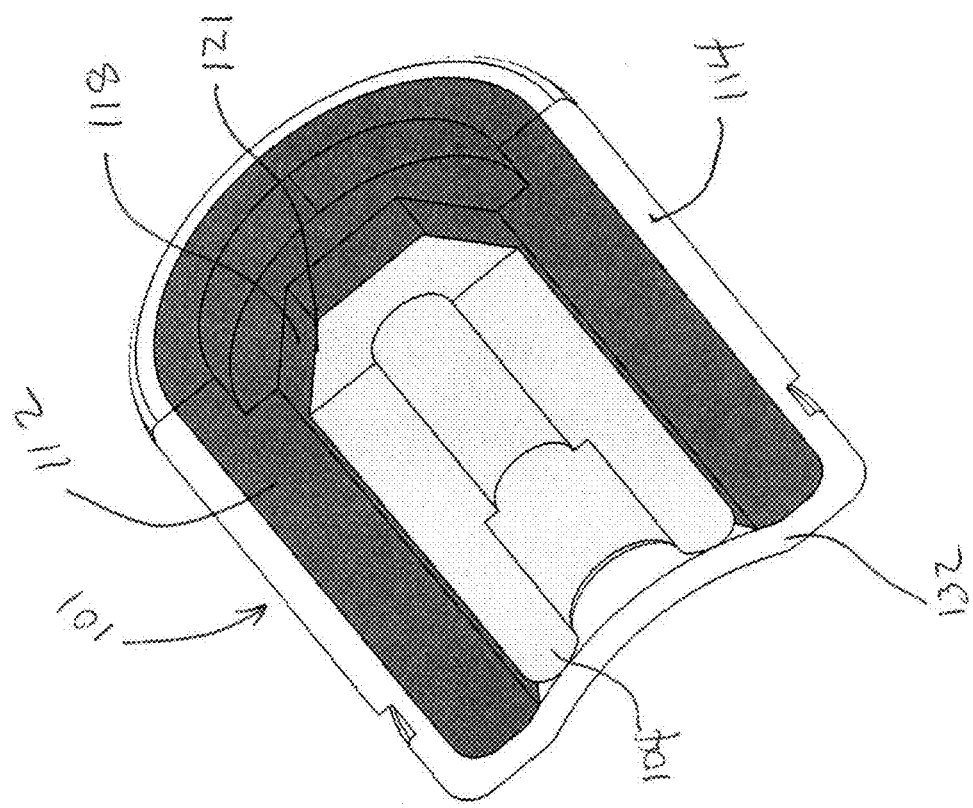
FIG. 8 shows a perspective view of an embodiment of a lined piston assembly.

FIG. 8 shows an embodiment of a lined piston 101 with the nut 104 having flat or substantially flat surfaces 121 running along the entire length of the nut 104. In other embodiments, the nut 104 can engage the interior surface of the sleeve 118 at a portion of the nut 104 at or proximate to the piston contact surface 110, at a portion at or proximate to an end opposite to the piston contact surface 110 or at a portion intermediate to the two ends. The sleeve 112 can have surfaces 118 running the entire length of the sleeve 112 or only for a portion of the length of the sleeve 112.

Figure 9:
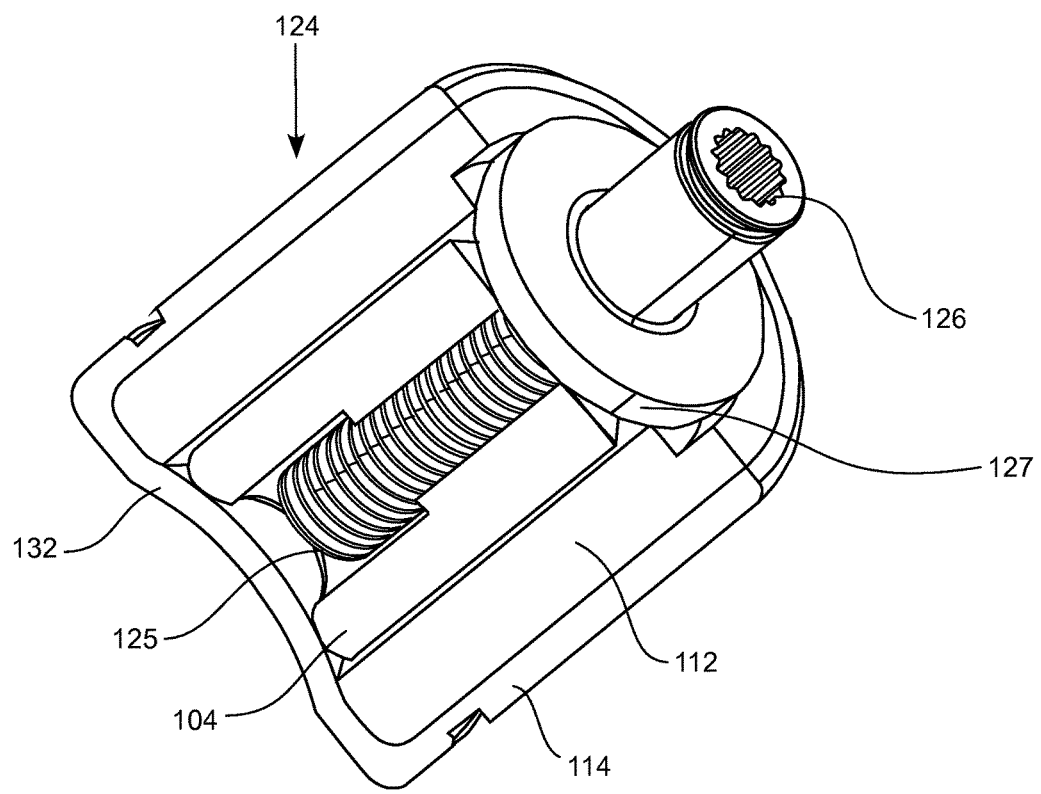
FIG. 9 shows a perspective view of an embodiment of a lined piston assembly showing a spindle and a drive portion of a spindle.

FIG. 9 shows a spindle 103 located in the lined piston 101 of FIG. 8. Here the spindle 103 includes an externally threaded portion 125 which communicates operatively with an internally threaded portion of the nut 104, and a drive engagement connection 126 for connecting to a drive unit, such as a motor 8, and a seal ring 127 comprising one or more sealing surfaces which provides seal between the shaft and the caliper body, or other brake part through which the spindle passes.

Figure 10:
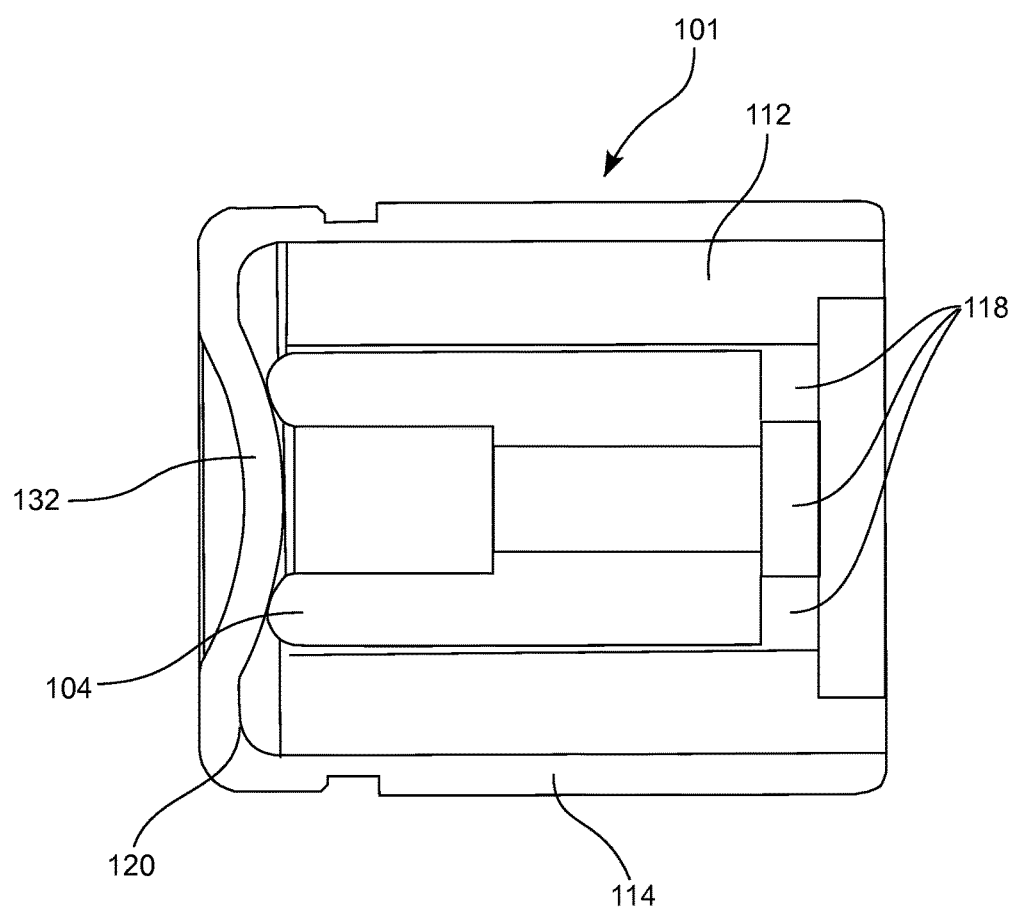
FIG. 10 shows a diagram of an embodiment of a lined piston assembly.
Figure 11:
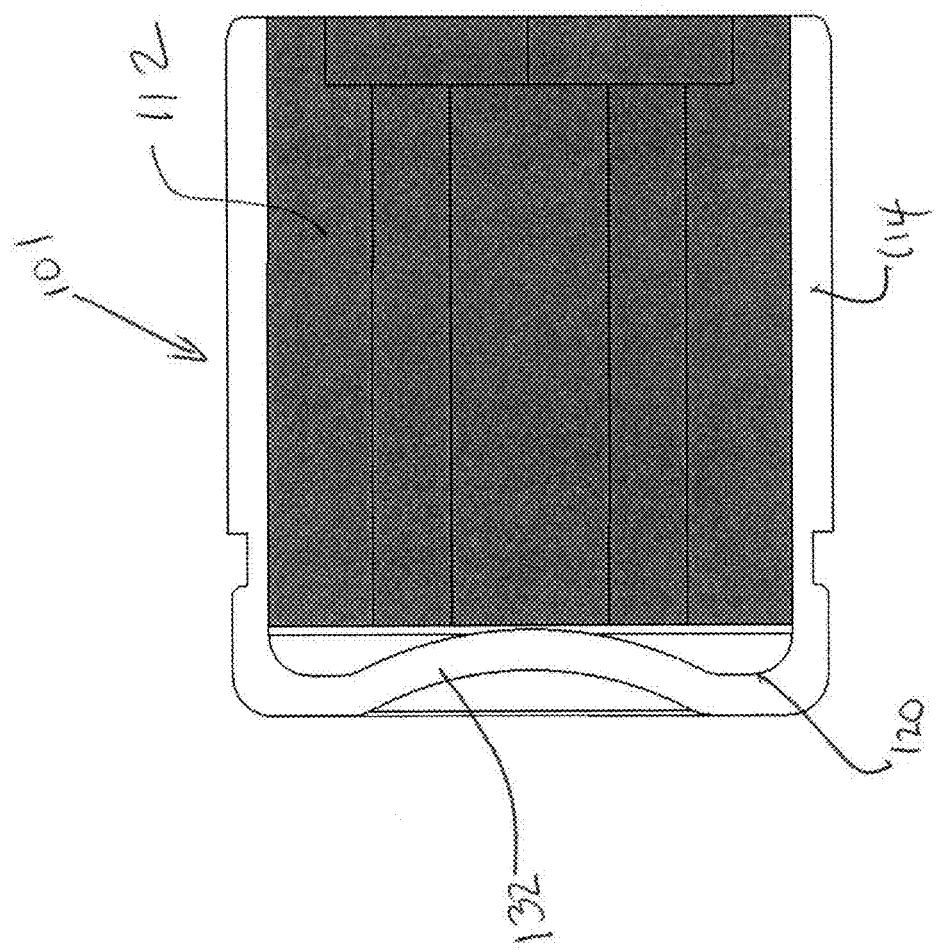
FIG. 11 shows a diagram of a lined piston.

FIGS. 10 and 11 show embodiments of a lined piston 101 wherein the sleeve 112 extends over at least a portion of the straight wall portion of the piston body 111 and only contacts the side wall surface 119, not contacting the front wall surface 120 of the piston 101. The embodiment of FIG. 10 also can allow the full inside diameter of the piston 101 to be available for pressure actuation of the piston 101.

The sleeve of FIG. 10 is shown with a nut 104 of FIG. 8, but the sleeve 112 having features of FIGS. 10 and 11 can be combined with other nuts 104 and other assembly designs disclosed herein.

FIG. 12 shows an embodiment of a nut 104 where the nut 104 includes a series of flat surfaces 121 connected to one another with rounded corners and a through-hole 131 located on the edge of each of the flat surfaces 121. Alternatively, a different number of flat surfaces 121 can be provided and be located symmetrically or asymmetrically around the nut 104. In some embodiments, fewer through-holes 131 can be provided, such as where there are fewer through-holes 131 than the number of flat surfaces 121, or more through-holes 131 such as where there is more than one through-hole 131 per flat surface 121. In some embodiments, a sharp corner can be provided between flat surfaces 121. In some embodiments, one or more or all of the through-holes 131 can be located away from the edge of the flat surface. In some embodiments, the flat or curved surfaces 121 of the nut which engage the flat surfaces of the sleeve 118 can define an ovalized shape or some other non-circular curve which can engage the flat or curved internal surfaces 118 of the sleeve an prevent relative rotation of the sleeve 112 and the nut 104.

Piston Body Manufacture

Piston bodies 111 as disclosed herein can be made by any appropriate technique to produce a piston body 111 having a relatively light weight. Alternatively or in combination, the piston body 111 can be made by any appropriate technique for low cost manufacture. Suitable techniques include, for example, drawing techniques, such as deep drawing. In some embodiments, the piston body can be drawn into a closed end cylinder with an optional rounded or curved closed end 116, where the closed end curve is directed into the body of the piston body 111.

Piston material can include any appropriate material having sufficient strength. Preferred materials include steels and other metals which have sufficient strength and can be drawn to the desired dimensions.

In some embodiments, the drawn piece can be further machined or processed, such as by machining, milling, turning, buffing, polishing, etc. to provide an appropriate surface finish for the part.

In some embodiments, a sealing groove 113 can be included as a part of the drawing process or by machining.

In some embodiment, an external diameter or an internal diameter can be dressed, such as by turning.

In some embodiments, surface features can be included on an interior surface of the piston body 111 so as to facilitate attachment of the sleeve 112 to the piston body or to inhibit/prevent movement rotationally and/or axially of the sleeve 112 relative to the piston body 111. In some embodiments, interior surface features can include ribs, grooves, protrusions, hooks, holes, spirals, and/or surface roughening. In some embodiments, one or more of the features can extend around the interior surface of the piston body 119, 120, or longitudinally along the interior surface of the piston body 119, 120 or a combination of around and longitudinally extend along the interior surface of the piston body 119, 120.

Sleeve Manufacture

Sleeves 112 as disclosed herein can be made by molding the plastic material into the piston body 111 or by externally molding the plastic material into the desired shape for the sleeve 112. In some embodiments, the sleeve can be made oversized and then inserted into the piston body by a suitable technique, such as by cooling the sleeve and heating the piston body.

In some embodiments, features can be included on the outer surface of the sleeve 112 which are configured to interface with one or more of the surface features on an interior surface of the piston body 119, 120, where the interaction assists in preventing or inhibiting relative movement between the sleeve 112 and the piston body 111.

In some embodiments, the sleeve 112, after it is present within the piston body 111 can be dressed, machined, or otherwise modified so as to provide fit, dimensions or features described herein.

In the various embodiments, features described in the alternative, for example curved ends and flat surfaces for the interior surface of the sleeve and the exterior surface of the nut can be interchanged within the disclosure where only one of the alternatives is described, except where the context indicates otherwise.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

CONCEPTS

1. A disk brake piston system comprising:
   a piston comprising:
   a metallic outer wall surrounding a central axis, the outer wall being of a material and a thickness which that could be formed by deep drawing;
   a metallic front wall closing one end of the outer wall, the front wall including a curved area extending toward an interior of the piston, the front wall being of a material and having a thickness that could be formed by deep drawing; and
   a sleeve positioned at least partially within the piston and configured to interface with an interior side surface of the outer wall such that the sleeve and the piston are restrained from rotating relative to one another around an axis parallel to the central axis, the sleeve comprising a flat or curved internal surface, having a non-circular cross-section, wherein the sleeve comprises a polymeric material.
2. The disk brake piston of Concept 1, wherein the flat or curved internal surface comprises a series of linked flat surfaces forming a polygon surrounding the central axis.
3. The disk brake piston of Concept 1, wherein the sleeve does not extend to the front wall.
4. The disk brake piston system of Concept 1 further comprising a nut located within the sleeve, the nut comprising a central opening having a treaded surface configured to communicate threadingly with a spindle having an external threaded surface, the nut further comprising an outer wall configured to interface with interior surface of the sleeve having the non-circular cross-section, such that the nut is restrained from freely rotating relative to the sleeve, and the outer wall of the nut configured to move longitudinally within the sleeve in a direction substantially parallel to the central axis, and the nut further comprising a first end located proximal the front wall, and the first end having a piston contact surface which contacts a nut contact surface on an inner surface of the front wall;
   the nut configured such when the spindle is turned in a first direction, the nut moves in a linear direction substantially parallel to the central axis toward the front wall, and the piston contact surface pushes against the nut contact surface and piston contact surface.
5. The disk brake piston system of Concept 4, wherein the piston is configured to apply an actuating force to a brake pad in operational communication with the piston.
6. The disk brake piston system of Concept 4, wherein nut outer wall comprises a series of flat surfaces positioned around the circumference of the outer wall of the nut and each of the flat surfaces communicates operably with a corresponding flat surface located on the inner surface of the sleeve.
7. The disk brake piston system of Concept 4, wherein the nut contact surface being located on curved area of the front wall, and when the spindle is turned in a first direction, the curved area of the front wall partially compresses.
8. The disk brake piston system of Concept 7, wherein the brake piston system is in operational communication with a disk brake system comprising a brake pad, and the disk brake piston system is configured to apply an actuating force to the brake pad, and upon a decrease in a temperature of the brake system, the dome partially decompresses with the piston continuing to apply an actuating force to the brake pad.
9. The disk brake piston system of Concept 8, wherein the disk brake system further comprises a rotor.
10. The disk brake piston system of Concept 4 further comprising a hole in the outer wall of the nut, the hole positioned to create an opening from the a side of the outer wall of the nut facing the front wall to a side of the outer wall of the nut facing opposite the front wall.
11. The disk brake piston system of Concept 6, further comprising a series of holes in the outer wall of the nut, each hole associated with a flat surface, and each of the hole positioned to create an opening from the a side of the outer wall of the nut facing the front wall to a side of the outer wall of the nut facing opposite the front wall.
12. The disk brake piston system of Concept 10, wherein the hole is on an edge of the outer wall of the nut.
13. The disk brake piston system of Concept 4, the piston further comprises sleeve non-rotation points on the inner surface of the outer wall of the piston, the sleeve non-rotation points are configured to resist relative rotation between the sleeve and the piston.
14. The disk brake piston system of Concept 13, wherein the sleeve non-rotation points comprise one or more grooves, lands, high points, low points, surface roughening, and/or holes.
15. The disk brake piston system of Concept 1, wherein the polymeric material is selected from the group consisting of thermosetting and thermoplastic polymers.
16. The disk brake piston system of Concept 15, wherein the polymeric material is a phenolic polymer.
17. The disk brake piston system of Concept 15, wherein the polymeric material is a crosslinked phenolic polymer.

The invention claimed is:

1. A disk brake piston system comprising:
a piston comprising:
a metallic outer wall surrounding a central axis, the outer wall being of a material and a thickness which that could be formed by deep drawing;
a metallic front wall closing one end of the outer wall, the front wall including a curved area extending toward an interior of the piston, the front wall being of a material and having a thickness that could be formed by deep drawing; and
a sleeve positioned at least partially within the piston and configured to interface with an interior side surface of the outer wall such that the sleeve and the piston are restrained from rotating relative to one another around an axis parallel to the central axis, the sleeve comprising a flat or curved internal surface, having a non-circular cross-section, wherein the sleeve comprises a polymeric material.

2. The disk brake piston system of claim 1 further comprising a nut located within the sleeve, the nut comprising a central opening having a treaded surface configured to communicate threadingly with a spindle having an external threaded surface, the nut further comprising an outer wall configured to interface with interior surface of the sleeve having the non-circular cross-section, such that the nut is restrained from freely rotating relative to the sleeve, and the outer wall of the nut configured to move longitudinally within the sleeve in a direction substantially parallel to the central axis, and the nut further comprising a first end located proximal the front wall, and the first end having a piston contact surface which contacts a nut contact surface on an inner surface of the front wall;
the nut configured such when the spindle is turned in a first direction, the nut moves in a linear direction substantially parallel to the central axis toward the front wall, and the piston contact surface pushes against the nut contact surface and piston contact surface.

3. The disk brake piston system of claim 2, wherein the nut contact surface being located on curved area of the front wall, and when the spindle is turned in a first direction, the curved area of the front wall partially compresses.

4. The disk brake piston system of claim 3, wherein the brake piston system is in operational communication with a disk brake system comprising a brake pad, and the disk brake piston system is configured to apply an actuating force to the brake pad, and upon a decrease in a temperature of the brake system, the dome partially decompresses with the piston continuing to apply an actuating force to the brake pad.

5. The disk brake piston system of claim 4, wherein the disk brake system further comprises a rotor.

6. The disk brake piston system of claim 2, wherein nut outer wall comprises a series of flat surfaces positioned around the circumference of the outer wall of the nut and each of the flat surfaces communicates operably with a corresponding flat surface located on the inner surface of the sleeve.

7. The disk brake piston system of claim 6, further comprising a series of holes in the outer wall of the nut, each hole associated with a flat surface, and each of the hole positioned to create an opening from the a side of the outer wall of the nut facing the front wall to a side of the outer wall of the nut facing opposite the front wall.

8. The disk brake piston system of claim 2 further comprising a hole in the outer wall of the nut, the hole positioned to create an opening from the a side of the outer wall of the nut facing the front wall to a side of the outer wall of the nut facing opposite the front wall.

9. The disk brake piston system of claim 8, wherein the hole is on an edge of the outer wall of the nut.

10. The disk brake piston system of claim 2, the piston further comprises sleeve non-rotation points on the inner surface of the outer wall of the piston, the sleeve non-rotation points are configured to resist relative rotation between the sleeve and the piston.

11. The disk brake piston system of claim 10, wherein the sleeve non-rotation points comprise one or more grooves, lands, high points, low points, surface roughening, and/or holes.

12. The disk brake piston system of claim 2, wherein the piston is configured to apply an actuating force to a brake pad in operational communication with the piston.

13. The disk brake piston system of claim 1, wherein the polymeric material is selected from the group consisting of thermosetting and thermoplastic polymers.

14. The disk brake piston system of claim 13, wherein the polymeric material is a phenolic polymer.

15. The disk brake piston system of claim 13, wherein the polymeric material is a crosslinked phenolic polymer.

16. The disk brake piston of claim 1, wherein the flat or curved internal surface comprises a series of linked flat surfaces forming a polygon surrounding the central axis.

17. The disk brake piston of claim 1, wherein the sleeve does not extend to the front wall.

18. The disk brake piston system of claim 1, wherein the curved area is formed substantially at a center of the front wall.

* * * * *